(12) United States Patent
Xiao et al.

(10) Patent No.: US 12,150,066 B2
(45) Date of Patent: Nov. 19, 2024

(54) WIRELESS TRANSMISSION METHOD FOR ENHANCING EFFICIENCY OF TRANSMIT POWER CONTROL OF MULTI-USER TRANSMISSION, AND WIRELESS COMMUNICATION DEVICE UTILIZING THE SAME

(71) Applicant: Realtek Semiconductor Corp., HsinChu (TW)

(72) Inventors: Zh-Hong Xiao, HsinChu (TW); Shau-Yu Cheng, HsinChu (TW); Wen-Yung Lee, HsinChu (TW); Chun-Kai Tseng, HsinChu (TW); Jhe-Yi Lin, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 344 days.

(21) Appl. No.: 17/893,143

(22) Filed: Aug. 22, 2022

(65) Prior Publication Data

US 2023/0254780 A1 Aug. 10, 2023

(30) Foreign Application Priority Data

Feb. 7, 2022 (TW) .................................. 111104275

(51) Int. Cl.
*H04W 52/26* (2009.01)
*H04L 1/00* (2006.01)
*H04W 52/52* (2009.01)

(52) U.S. Cl.
CPC ......... *H04W 52/262* (2013.01); *H04L 1/0003* (2013.01)

(58) Field of Classification Search
CPC .. H04W 52/262; H04W 52/52; H04L 1/0003; H04L 2001/0093; H04L 1/0009; H04L 1/0015
See application file for complete search history.

(56) References Cited

U.S. PATENT DOCUMENTS

| 2008/0051045 A1* | 2/2008 | Hwang | H04W 52/143 455/127.2 |
| 2010/0099427 A1* | 4/2010 | Abedi | H04W 72/20 455/450 |
| 2010/0202561 A1* | 8/2010 | Gorokhov | H04L 27/36 375/295 |

(Continued)

*Primary Examiner* — Dominic E Rego
(74) *Attorney, Agent, or Firm* — Winston Hsu

(57) ABSTRACT

A wireless transmission method includes obtaining an MCS (modulation and coding scheme) rate and a power amplifier gain of each station in a set of stations for a multi-user (MU) transmission, generating a maximum available MCS rate according to a plurality of MCS rates of the set of stations, selecting a power amplifier gain of the MU transmission according to the maximum available MCS rate, adjusting a digital gain of each station according to the power amplifier gain of the MU transmission and the power amplifier gain of each station, adjusting a frequency domain signal of each station according to the digital gain thereof, converting a plurality of adjusted frequency domain signals of the set of stations into a time domain signal, and generating an amplified signal for the MU transmission according to the power amplifier gain of the MU transmission and the time-domain signal.

20 Claims, 4 Drawing Sheets

(56) References Cited

U.S. PATENT DOCUMENTS

| | | | |
|---|---|---|---|
| 2010/0220807 A1* | 9/2010 | Nogami | H04L 5/0046 |
| | | | 375/295 |
| 2011/0105025 A1* | 5/2011 | Wang | H04L 1/0019 |
| | | | 455/41.2 |
| 2013/0172045 A1 | 7/2013 | Caballero | |
| 2015/0139159 A1 | 5/2015 | Amini | |
| 2016/0270118 A1* | 9/2016 | He | H04W 74/06 |
| 2017/0041929 A1* | 2/2017 | Noh | H04L 5/0037 |
| 2017/0063438 A1* | 3/2017 | Baik | H04B 7/0617 |
| 2018/0192444 A1* | 7/2018 | Park | H04W 74/0833 |
| 2020/0037183 A1* | 1/2020 | Ganu | H04W 52/367 |
| 2020/0068562 A1* | 2/2020 | Wu | H04L 1/0068 |
| 2021/0126735 A1* | 4/2021 | Gan | H04L 1/0041 |
| 2022/0159757 A1* | 5/2022 | Balasubramanian | |
| | | | H04L 5/0055 |
| 2022/0279389 A1* | 9/2022 | Xing | H04W 28/0268 |
| 2022/0417925 A1* | 12/2022 | Sheriff | H04W 72/0446 |
| 2023/0246657 A1* | 8/2023 | Paz | H04W 52/42 |
| | | | 455/114.3 |

\* cited by examiner

WIRELESS TRANSMISSION METHOD FOR ENHANCING EFFICIENCY OF TRANSMIT POWER CONTROL OF MULTI-USER TRANSMISSION, AND WIRELESS COMMUNICATION DEVICE UTILIZING THE SAME

BACKGROUND OF THE INVENTION

1. Field of the Invention

The invention relates to wireless communication, and specifically, to a wireless transmission method for enhancing efficiency of a transmit power control of a multi-user transmission, and a wireless communication device utilizing the same

2. Description of the Prior Art

A multi-user (MU) transmission refers to transmission of a data packet for multiple communication devices from a single communication device to the multiple communication devices. In the related art, data of multiple communication devices are encoded by the same modulation and coding scheme (MCS) rate to generate an MU packet for transmission. However, the efficiency of packet transmission is closely related to the type of data. Since the type of the data of the multiple communication devices may be different, the data cannot be transmitted in large quantities at once, resulting in a reduction of the MU diversity gain. For example, if the data of communication devices A and B are encoded by the MCS rate MCS4 and transmitted in the same MU packets, the communication device A is downloading a video, and the communication device B is accessing a web page, then the packets are likely to contain only the data of the communication device A but not the data of the communication device B, or the packets contain the data of both the communication device A and the communication device B, but the length of the packets is very short owing to the small quantity of web page data, preventing a large quantity of the data of communication device from being transmitted at once, leading to a reduction in transmission efficiency.

SUMMARY OF THE INVENTION

According to an embodiment of the invention, a wireless transmission method includes setting up a set of stations for a multi-user transmission, obtaining a modulation and coding scheme (MCS) rate and a power amplifier gain of each station in the set of stations, generating a maximum available MCS rate according to a plurality of MCS rates of all stations in the set of stations, selecting a power amplifier gain of the multi-user transmission according to at least the maximum available MCS rate, and adjusting a digital gain of the each station according to the power amplifier gain of the multi-user transmission and the power amplifier gain of the each station. The wireless transmission method further includes adjusting a frequency domain signal of the each station according to the digital gain of the each station to generate an adjusted frequency domain signal; converting a plurality of adjusted frequency domain signals of all stations in the set of stations into a time domain signal; generating an amplified signal according to the power amplifier gain of the multi-user transmission and the time-domain signal; and transmitting the amplified signal.

According to an embodiment of the invention, a wireless communication device includes a transmit power controller, a digital gain controller, an inverse fast Fourier transform (IFFT) circuit, a power amplifier, and an antenna. The transmit power controller is used to obtain a modulation and coding scheme (MCS) rate and a power amplifier gain of each station in a set of stations for a multi-user transmission, generate a maximum available MCS rate according to a plurality of MCS rates of all stations in the set of stations, select a power amplifier gain of the multi-user transmission according to at least the maximum available MCS rate, and adjust a digital gain of the each station according to the power amplifier gain of the multi-user transmission and the power amplifier gain of the each station. The digital gain controller is coupled to the transmit power controller, and is used to adjust a frequency domain signal of the each station according to the digital gain of the each station to generate an adjusted frequency domain signal. The IFFT circuit is coupled to the digital gain controller, and is used to convert a plurality of adjusted frequency domain signals of all stations in the set of stations into a time domain signal. The power amplifier is coupled to the IFFT circuit, and is used to generate an amplified signal according to the power amplifier gain of the multi-user transmission and the time-domain signal. The antenna is coupled to the power amplifier, and is used to transmit the amplified signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
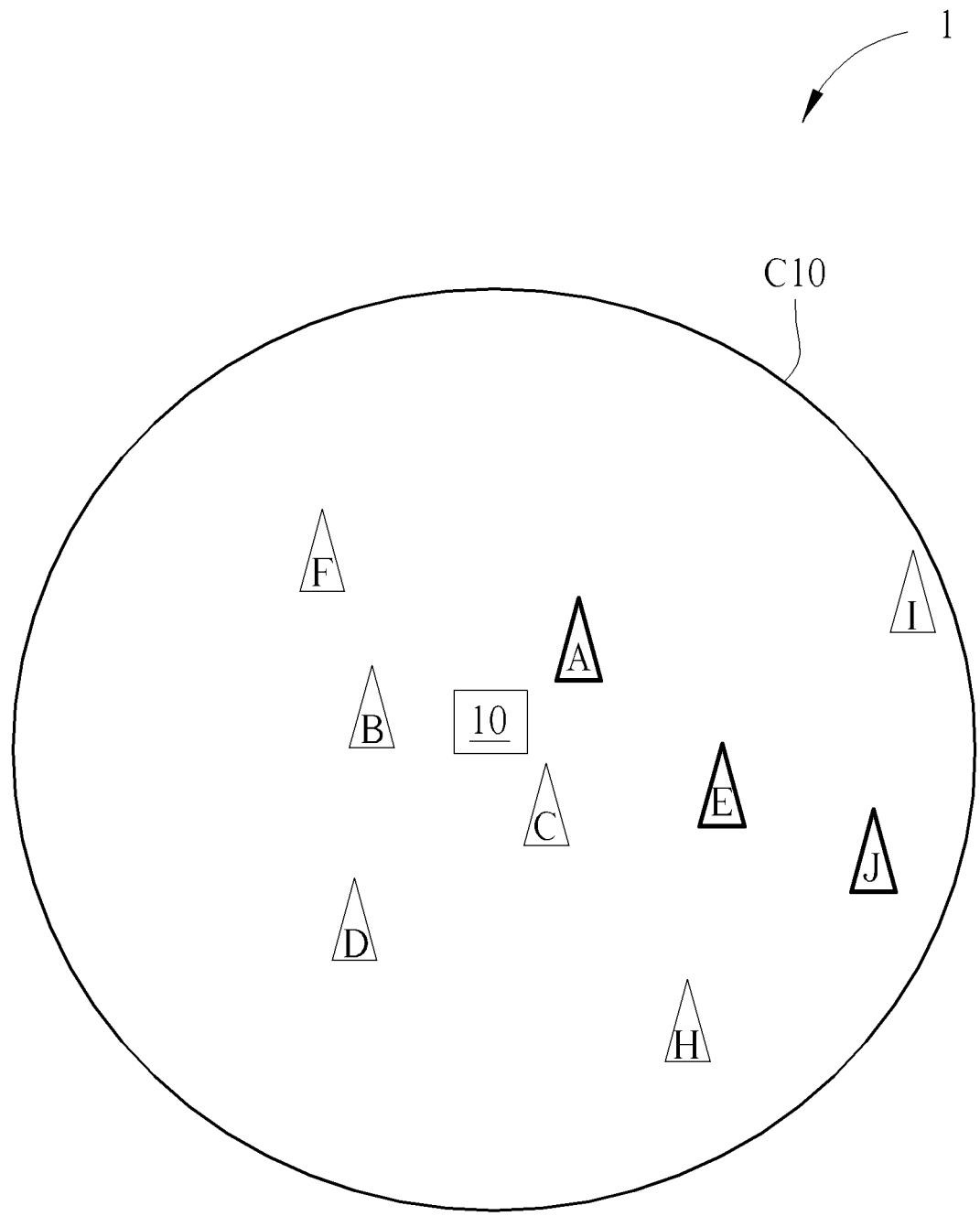
FIG. 1 is a schematic diagram of a wireless communication system according to an embodiment of the invention.

FIG. 1 is a schematic diagram of a wireless communication system 1 according to an embodiment of the invention. The wireless communication system 1 includes an access point 10 and stations A to J. The stations A to J are randomly distributed in a radio coverage area C10 of the access point 10, and at various distances from the access point 10. For example, the stations A, E, and J are at small to large distances from the access point 10. The wireless communication system 1 is compatible with the IEEE 802.11 protocol such as the IEEE 802.11ax protocol, and may transmit using an orthogonal frequency-division multiple access (OFDMA) mechanism.

The wireless communication system 1 may perform a point-to-multipoint (P2MP) communication, that is, the access point 10 may perform a multi-user (MU) transmission on N stations of the stations A to J, so as to transmit data to the N stations at once, N being a positive integer greater than 1. The N stations may download similar types of data such as video data. For example, the access point 10 may perform a downlink (DL) MU transmission to the stations A, E, and J for downloading videos, so as to transmit the data to the stations A, E, and J using the same MU packet. When performing an MU transmission of the N stations, the access point 10 may determine a transmission power of the MU packet, and digital gains and modulation and coding scheme (MCS) rates of the N stations, enabling the N stations to receive the MU packets from different distances while maintaining the signal quality, thereby increasing the efficiency of transmit power control.

Figure 2:
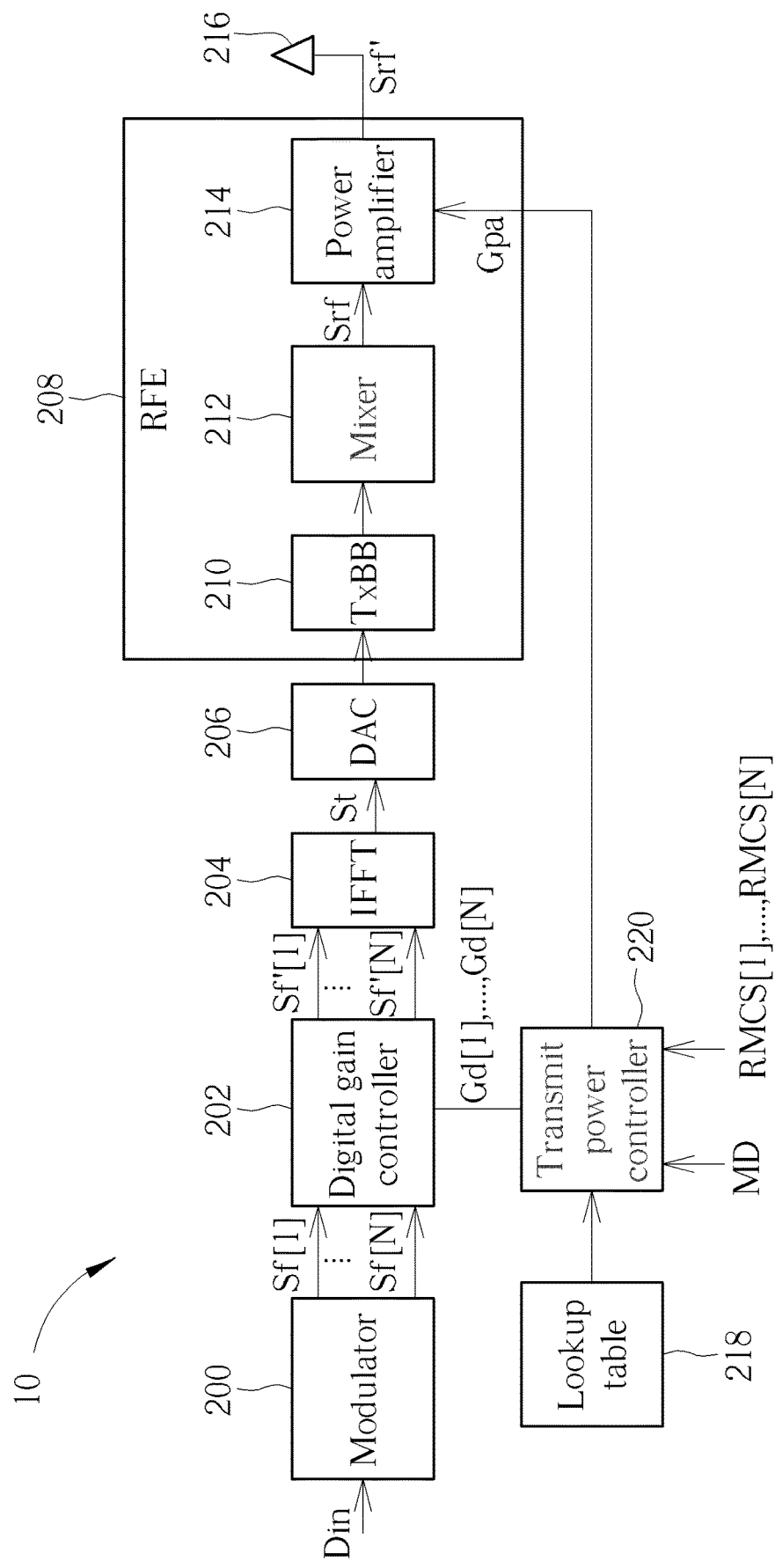
FIG. 2 is a block diagram of the access point in FIG. 1.

FIG. 2 is a block diagram of the access point 10. The access point 10 may perform a DL MU transmission, receiving data Din to generate an amplified signal Srf' carrying MU packets for transmission. The access point 10 includes a modulator 200, a digital gain controller 202, an inverse fast Fourier transform (IFFT) circuit 204, a digital-to-analog converter (DAC) 206, a radio frequency front end (RFE) 208, an antenna 216, a lookup table 218 and a transmit power controller 220. The RF front end 208 may include a transmit baseband (TxBB) circuit 210, a mixer 212 and a power amplifier 214. The modulator 200, the digital gain controller 202, the inverse fast Fourier transform circuit 204, the digital-to-analog converter 206, the transmit baseband circuit 210, the mixer 212, the power amplifier 214 and the antenna 216 may be coupled in sequence. The transmit power controller 220 may be coupled to the digital gain controller 202 and the power amplifier 214. The lookup table 218 may be stored in a memory internal or external to the transmit power controller 220.

The larger the output power of the power amplifier 214 is, the larger the range of a DL transmission will be. However, if the output power is too large, the power amplifier 214 may not be able to operate in the linear range thereof and the signal quality will be degraded. The signal quality may be represented by an error vector magnitude (EVM). A larger EVM represents a worse signal quality. Further, a communication protocol such as the IEEE 802.11ax protocol may be adopted by the wireless communication system 1, and may specify the MCS that meets the EVM requirement, as shown in Table 1:

TABLE 1

| MCS rate | Modulation | Coding rate | EVM requirement (dB) |
| --- | --- | --- | --- |
| 0 | BPSK | 1/2 | −5 |
| 1 | QPSK | 1/2 | −10 |
| 2 | QPSK | 3/4 | −13 |
| 3 | 16 QAM | 1/2 | −16 |
| 4 | 16 QAM | 3/4 | −19 |
| 5 | 64 QAM | 2/3 | −22 |
| 6 | 64 QAM | 3/4 | −25 |
| 7 | 64 QAM | 5/6 | −27 |
| 8 | 256 QAM | 3/4 | −30 |
| 9 | 256 QAM | 5/6 | −32 |
| 10 | 1024 QAM | 3/4 | −35/−32 |
| 11 | 1024 QAM | 5/6 | −35/−32 |

MCS defines a modulation method and a coding rate for determining a data rate, and the data rate may be represented by a MCS rate. A larger MCS rate may correspond to a higher data rate. For example, in Table 1, the MCS rate may be one of 0 to 11, the data rates of MCS0 to MCS11 may increase in sequence, and the EVM requirements of MCS0 to MCS11 may decrease in sequence. For MCS0, the modulation scheme is binary phase shift keying (BPSK) and the coding rate is 1/2. For MCS1, the modulation scheme is 16 quadrature phase shift keying (QPSK) and the coding rate is 1/2, For MCS11, the modulation scheme is 1024 quadrature amplitude modulation (QAM) and the coding rate is 5/6. In some embodiments, as the output power of the power amplifier 214 increases, the EVM will degrade, and the EVM requirement will increase. According to Table 1, the MCS rate used by the access point 10 is reduced to achieve the increased EVM requirement. Therefore, when it is desirable to cover a long-range DL transmission, the output power of the power amplifier 214 may be increased, and the MCS rate may be reduced. When it is desirable to cover a short-range DL transmission, the output power of the power amplifier 214 may be reduced, and the MCS rate may be increased.

The lookup table 218 may include paired up MCS rates and power amplifier gains. The power amplifier gain may be the gain of the power amplifier 214. The access point 10 may set the N stations such as the stations A, E, and J to be a set of stations for a DL MU transmission. The transmit power controller 220 may receive a MCS selection mode MD and MCS rates RMCS[1] to RMCS[N], where N is the number of stations for the DL MU transmission, the MCS selection mode MD represents a mode for selecting a maximum available MCS rate, and the MCS rates RMCS[1] to RMCS[N] represent N MCS rates for the N stations. The MCS selection mode MD may be one of a modal value mode, a mean mode, a median mode, a safe mode, and an aggressive mode. The transmit power controller 220 may use the lookup table 218 to generate N digital gains Gd[1] to Gd[N] and a power amplifier gain Gpa for the DL MU transmission according to the MCS selection mode MD and the MCS rates RMCS[1] to RMCS[N] of the N stations, as detailed in the wireless transmission method 300 in FIG. 3, and will be explained in more detail in the subsequent paragraphs. In some embodiments, if the MCS rate of an nth station in the N stations is greater than the maximum available MCS rate, in order to meet the EVM requirement, the transmit power controller 220 may reduce the MCS rate of the nth station, where n is a positive integer ranging from 1 to N. If the MCS rate of the nth station is less than the maximum available MCS rate, in order to compensate for the transmit power loss, the transmit power controller 220 may increase the digital gain Gd[n] of the nth station. The transmit power controller 220 may be implemented by a combination of software, firmware and hardware.

The modulator 200 may be a QAM modulator, and may receive the data Din to generate frequency domain signals Sf[1] to Sf[N] according to N MCSes of the N stations, respectively. The frequency domain signals Sf[1] to Sf[N] may respectively carry data of the N stations. Each frequency domain signal corresponds to one of the N stations, and has a frequency range. The digital gain controller 202 may adjust the frequency domain signals Sf[1] to Sf[N] according to the digital gains Gd[1] to Gd[N] to generate adjusted frequency domain signals Sf[1] to Sf[N], respectively. The inverse fast Fourier transform circuit 204 may transform the adjusted frequency domain signals Sf[1] to Sf[N] of the N stations into a time domain signal St. The digital-to-analog converter 206 may perform a digital-to-analog conversion on the time domain signals St. The transmit baseband circuit 210 may perform baseband processing on the output of the digital-to-analog converter 206, and the mixer 212 may mix the output of the transmit baseband circuit 210 with a carrier to generate a radio frequency (RF) signal Srf. The power amplifier 214 may amplify the RF signal Srf according to the power amplifier gain Gpa to generate the amplified signal Srf', and the antenna 216 may transmit the amplified signal Srf' during the DL MU transmission. The amplified signal Srf' carries the MU packets of the N stations.

Figure 3:
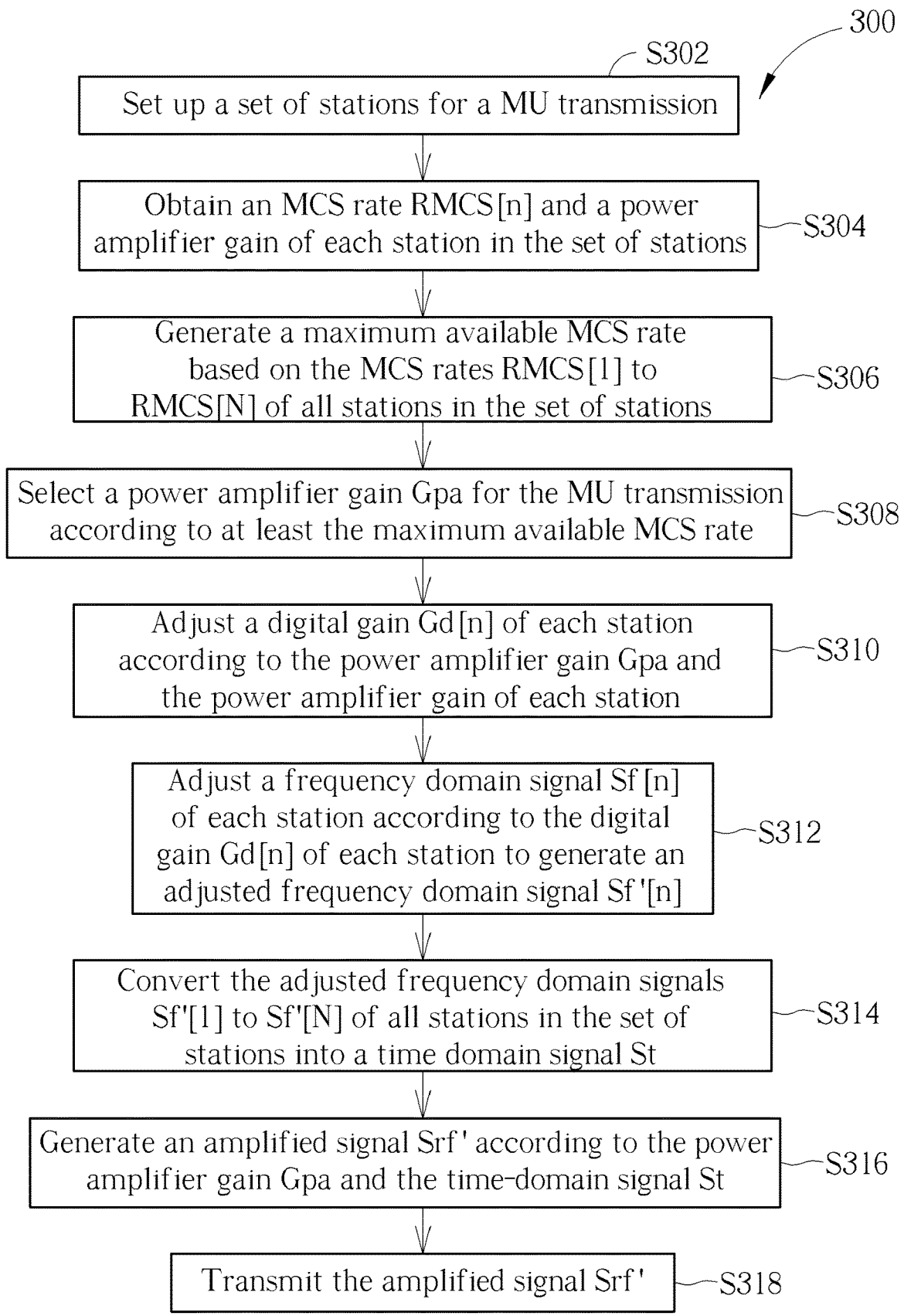
FIG. 3 is a flowchart of a wireless communication method of the access point in FIG. 1.

FIG. 3 is a flowchart of a wireless transmission method 300 for use in the access point 10. The wireless transmission method 300 includes Steps S302 to S318 for determining N digital gains Gd[1] to Gd[N] of the N stations and a power amplifier gain Gpa of the MU transmission, and performing the MU transmission accordingly. Any reasonable step change or adjustment is within the scope of the disclosure. Steps S302 to S318 are detailed as follows:

Step S302: Set up a set of stations for a MU transmission;
Step S304: Obtain an MCS rate RMCS[n] and a power amplifier gain of each station in the set of stations;
Step S306: Generate a maximum available MCS rate based on the MCS rates RMCS[1] to RMCS[N] of all stations in the set of stations;
Step S308: Select a power amplifier gain Gpa for the MU transmission according to at least the maximum available MCS rate;
Step S310: Adjust a digital gain Gd[n] of each station according to the power amplifier gain Gpa and the power amplifier gain of each station;
Step S312: Adjust a frequency domain signal Sf[n] of each station according to the digital gain Gd[n] of each station to generate an adjusted frequency domain signal Sf[n];
Step S314: Convert the adjusted frequency domain signals Sf[1] to Sf[N] of all stations in the set of stations into a time domain signal St;
Step S316: Generate an amplified signal Srf' according to the power amplifier gain Gpa and the time-domain signal St;
Step S318: Transmit the amplified signal Srf'.

The wireless transmission method 300 is explained in detail with reference to FIG. 1. In Step S302, the set of stations to perform a DL MU transmission may include the N stations at different distances, for example, 3 stations (N=3) such as the stations A, E, and J. In Step S304, the transmit power controller 220 obtains the MCS rates RMCS[1], RMCS[2], and RMCS[3] of the stations A, E, and J for DL SU (single user) transmissions, e.g., RMCS[1]=11, RMCS[2]=7, and RMCS[3]=3. Next, the transmit power controller 220 uses the lookup table 218 to obtain matching power amplifier gains of the stations A, E, and J. For example, the matching power amplifier gain of the station A is 9 dBm, the matching power amplifier gain of the station E is 12 dBm, and the matching power amplifier gain of the station J is 15 dBm.

Figure 4:
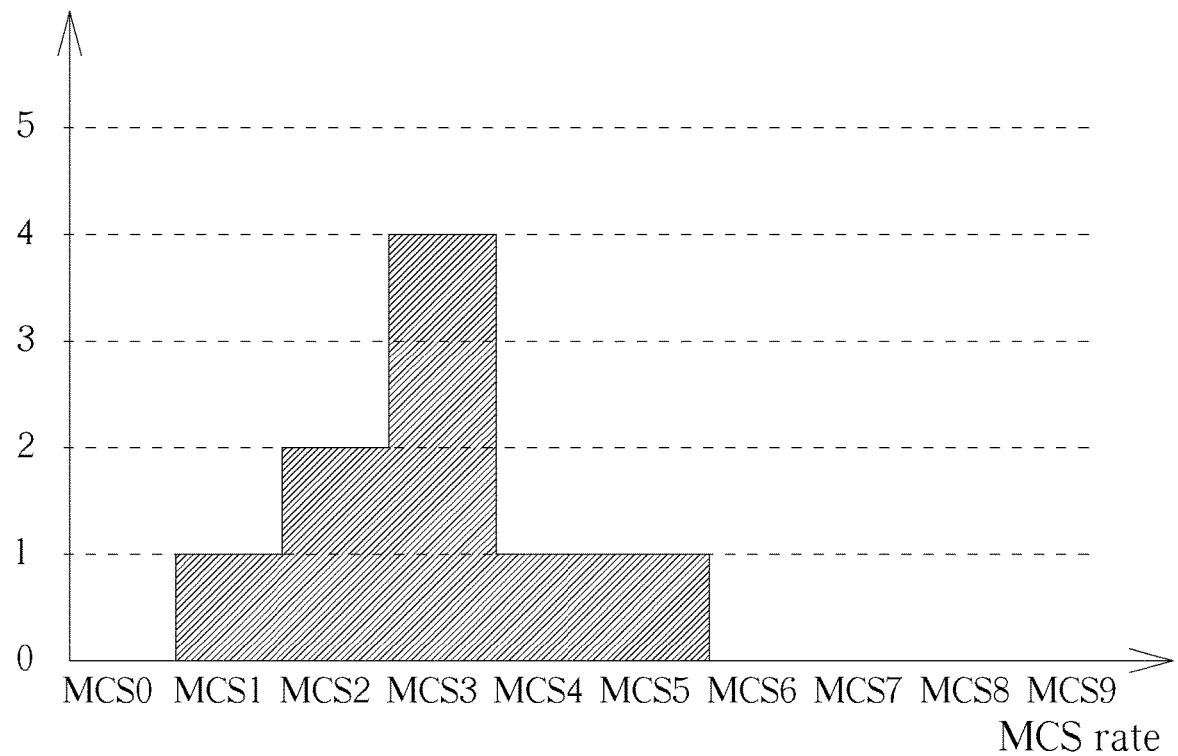
FIG. 4 is a schematic diagram of a MCS distribution.

In Step S306, the transmit power controller 220 analyzes the distribution of the DL SU MCS rate in the same MU packet, and generates the maximum available MCS rate in the DL MU transmission accordingly. The maximum available MCS rate is the maximum MCS rate the N stations may adopt in the DL MU transmission. FIG. 4 is a schematic diagram of the MCS distribution of the MU packet for the N stations, where the horizontal axis represents the MCS rate, and the vertical axis represents the station count. FIG. 4 shows that the mode of the MCS distribution is MCS3, the mean is MCS3, the median is MCS3, the maximum is MCS5, and the minimum is MCS1. When the MCS selection mode MD is set to the modal value mode, the transmit power controller 220 sets the maximum available MCS rate according to the mode (MCS3) of the MCS distribution. When the MCS selection mode MD is the mean mode, the transmit power controller 220 sets the maximum available MCS rate according to the mean (MCS3) of the MCS distribution. When the MCS selection mode MD is the median mode, the transmit power controller 220 sets the maximum available MCS rate according to the median (MCS3) of the MCS distribution. When the MCS selection mode MD is the safe mode, the transmit power controller 220 sets the maximum available MCS rate according to the minimum (MCS1) of the MCS distribution. When the MCS selection mode MD is the aggressive mode, the transmit power controller 220 sets the maximum available MCS rate according to the maximum of the MCS distribution (MCS5). In Step S308, the transmit power controller 220 selects the matching power amplifier gain of the maximum available MCS rate as the power amplifier gain Gpa of the MU transmission according to the lookup table 218. Table 2 shows the settings of the stations A, E, and J for SU transmissions, and for a DL MU transmission in the mean mode or the median mode. According to Table 2, in the mean mode or the median mode, the transmit power controller 220 sets the mean or median (MCS7) of the MCS distributions of the stations A, E, J as the maximum available MCS rate, and selects 12 dBm (=the matching power amplifier gain of MCS7) as the power amplifier gain Gpa of the MU transmission.

TABLE 2

| SU transmission | | | MU transmission | | | |
|---|---|---|---|---|---|---|
| Station | Power amplifier gain (dBm) | DL SU MCS rate | Station | Power amplifier gain (dBm) | Digital gain (dB) | DL MU MCS rate |
| A | 9 | 11 | (A, E, J) | 12 | (−3, 0, +3) | (7, 7, 3) |
| E | 12 | 7 | (A, E, J) | 12 | (−3, 0, +3) | (7, 7, 3) |
| J | 15 | 3 | (A, E, J) | 12 | (−3, 0, +3) | (7, 7, 3) |

In Step S310, the transmit power controller 220 may subtract the power amplifier gain of the SU transmission of each station from the power amplifier gain Gpa of the MU transmission to generate a digital gain Gd[n]. For example, referring to Table 2, the transmit power controller 220 may subtract the power amplifier gains (9, 12, 15) of the SU transmissions of the stations A, E, J from the power amplifier gain Gpa (12) of the MU transmissions to generate digital gains (Gd[1], Gd[2], Gd[3])=(−3, 0, +3). Therefore, in order to compensate for the loss of transmission power, the digital gain Gd[1] of the station A is adjusted to −3 dB, the digital gain Gd[2] of the station E is maintained at 0 dB, and the digital gain Gd[3] of the station J is adjusted to 3 dB, so that the stations A, E, and J may receive the MU packet from different distances. In some embodiments, if the MCS rate of the nth station in the N stations exceeds the maximum available MCS rate, the transmit power controller 220 may update the MCS rate of the nth station to the maximum available MCS rate. For example, referring to Table 2, since the maximum available MCS rate is MCS7, the transmit power controller 220 may update the DL MU MCS rates (11, 7, 3) of the stations A, E, J to (7, 7, 3), for the modulator 200 to generate frequency domain signals Sf[1] to Sf[3] according to the adjusted DL MU MCS rates (7, 7, 3) of the stations A, E, and J, respectively. Therefore, in order to meet the EVM requirement, the DL MU MCS rate of the station A is reduced to MCS7 to maintain the signal quality.

In Step S312, the digital gain controller 202 adjusts the frequency domain signals Sf[1], Sf[2], Sf[3] according to the digital gains (−3, 0, +3) of the stations A, E, J, to generate the adjusted frequency domain signals Sf[1], Sf[2], Sf[3], respectively. In Step S314, the inverse fast Fourier transform circuit 204 performs a frequency-domain to time-domain conversion on the adjusted frequency domain signals Sf[1], Sf[2], Sf[3] of stations A, E, J to generate a time-domain signal St. In Step S316, the digital-to-analog converter 206, the transmit baseband circuit 210 and the mixer 212 sequentially process the time-domain signal St to generate a radio frequency signal Srf, then the power amplifier 214 amplifies the radio frequency signal Srf according to the power amplifier gain Gpa (=12 dBm) to generate an amplified signal Srf', and the antenna 216 transmits the amplified signal Srf' for the DL MU transmission.

In some embodiments, the transmit power controller 220 adopts the safe mode to set the maximum available MCS rate (S306). In the safe mode, the maximum available MCS rate is the minimum in the MCS distribution. In some embodiments, the transmit power controller 220 may select the power amplifier gain Gpa according to the maximum available MCS rate and the digital gains Gd[1] to Gd[N] of the N stations (S308). The transmit power controller 220 may use the lookup table 218 to obtain the matching power amplifier gain of the maximum available MCS rate, and select a gain slightly exceeding the matching power amplifier gain of the maximum available MCS rate as the power amplifier gain Gpa such that a sum of the digital gains Gd[1] to Gd[N] is approximately 0 (S310), so as to achieve a power balance in all frequency bands of the MU transmission. In other embodiments, the transmit power controller 220 may select the power amplifier gain Gpa of the MU transmission according to the maximum available MCS rate, the second smallest one of the MCS rates of the N stations, and the digital gains Gd[1] to Gd[N] of the N stations (S308). The transmit power controller 220 may use the lookup table 218 to obtain the matching power amplifier gain of the maximum available MCS rate and the matching power amplifier gain of the second smallest one of the MCS rates of the N stations, and select a gain between the matching power amplifier gain of the maximum available MCS rate and the matching power amplifier gain of the second smallest one of the MCS rates of the N stations as the power amplifier gain Gpa, such that a sum of the digital gains Gd[1] to Gd[N] is approximately 0 (S310), so as to achieve a power balance in all frequency bands of the MU transmission.

Table 3 shows the settings of the stations A, E, and J for SU transmissions, and for a DL MU transmission in the safe mode. According to Table 3, in the safe mode, the transmit power controller 220 will set the minimum of the MCS distribution (MCS3) of the stations A, E, J as the maximum available MCS rate, and select a matching power amplifier of 13 dBm (between the matching power amplifier gain (15 dBm) of MCS3 and the matching power amplifier gain (12 dBm) of the second smallest MCS rate MCS7) as the power amplifier gain Gpa of the MU transmission, such that a sum of the digital gains (Gd[1], Gd[2], Gd[3])=(−4, 1, +2) is approximately 0 (−4+1+2=−1). Therefore, in order to compensate for the loss of transmission power, the digital gain Gd[1] of the station A is adjusted to −4 dB, the digital gain Gd[2] of the station E is maintained to −1 dB, and the digital gain Gd[3] of the station J is adjusted to 2 dB, so that the stations A, E, and J may receive the MU packet from different distances, while achieving the power balance in all frequency bands. Since the maximum available MCS rate is MCS3, the transmit power controller 220 may update the DL MU MCS rates (11, 7, 3) of the stations A, E, J to (3, 3, 3), for the modulator 200 to generate frequency domain signals Sf[1] to Sf[3] according to the adjusted DL MU MCS rates (3, 3, 3) of the stations A, E, and J, respectively. In order to meet the EVM requirements, the DL MU MCS rates of both the stations A and E are reduced to MCS3 to maintain the signal quality.

TABLE 3

| SU transmission | | | MU transmission | | | |
|---|---|---|---|---|---|---|
| Station | Power amplifier gain (dBm) | DL SU MCS rate | Station | Power amplifier gain (dBm) | Digital gain (dB) | DL MU MCS rate |
| A | 9 | 11 | (A, E, J) | 13 | (−4, −1, +2) | (3, 3, 3) |
| E | 12 | 7 | (A, E, J) | 13 | (−4, −1, +2) | (3, 3, 3) |
| J | 15 | 3 | (A, E, J) | 13 | (−4, −1, +2) | (3, 3, 3) |

In some embodiments, the transmit power controller 220 adopts the aggressive mode to set the maximum available MCS rate (S306). In the aggressive mode, the maximum available MCS rate is the maximum in the MCS distribution. In some embodiments, the transmit power controller 220 may select the power amplifier gain Gpa of the MU transmission according to the maximum available MCS rate, the second largest one of the MCS rates of the N stations, and the digital gains Gd[1] to Gd[N] of the N stations (S308). The transmit power controller 220 may use the lookup table 218 to obtain the matching power amplifier gain of the maximum available MCS rate and the matching power amplifier gain of the second largest one of the MCS rates of the N stations, and select a gain between the matching power amplifier gain of the maximum available MCS rate and the matching power amplifier gain of the second largest one of the MCS rates of the N stations as the power amplifier gain Gpa, such that a sum of the digital gains Gd[1] to Gd[N] is approximately 0 (S310), so as to achieve a power balance in all frequency bands of the MU transmission.

Table 4 shows the settings of the stations A, E, and J for SU transmissions, and for a DL MU transmission in the aggressive mode. According to Table 4, in the aggressive mode, the transmit power controller 220 will set the maximum of the MCS distribution (MCS11) of the stations A, E, J as the maximum available MCS rate, and select a matching power amplifier of 10 dBm (between the matching power amplifier gain (9 dBm) of MCS11 and the matching power amplifier gain (12 dBm) of the second largest MCS rate MCS7) as the power amplifier gain Gpa of the MU transmission, so that a sum of the digital gains (Gd[1], Gd[2], Gd[3])=(−1, +2, +5) is approximately 0(−1+2+5=6). To compensate for the loss of transmission power, the digital gain Gd[1] of the station A is adjusted to −1 dB, the digital gain Gd[2] of the station E is adjusted to 2 dB, and the digital gain Gd[3] of the station J is adjusted to 5 dB, so that the stations A, E, and J may receive the MU packet from different distances, while achieving the power balance in all frequency bands. Since the maximum available MCS rate is MCS11, the transmit power controller 220 may keep the DL MU MCS rates (11, 7, 3) unchanged, for the modulator 200 to generate frequency domain signals Sf[1] to Sf[3] according to the adjusted DL MU MCS rates (11, 7, 3) of the stations A, E, and J, respectively, so as to satisfy the EVM requirements.

TABLE 4

| | SU transmission | | MU transmission | | | |
|---|---|---|---|---|---|---|
| Station | Power amplifier gain (dBm) | DL SU MCS rate | Station | Power amplifier gain (dBm) | Digital gain (dB) | DL MU MCS rate |
| A | 9 | 11 | (A, E, J) | 10 | (−1, +2, +5) | (11, 7, 3) |
| E | 12 | 7 | (A, E, J) | 10 | (−1, +2, +5) | (11, 7, 3) |
| J | 15 | 3 | (A, E, J) | 10 | (−1, +2, +5) | (11, 7, 3) |

While the embodiments of the invention are explained with reference to a DL transmission in a wireless local area network, those skilled in the art may modify the wireless transmission method 300 based on similar principles of the invention for an uplink (UL) transmission and/or for other communication systems such as long term evolution (LTE) and worldwide Interoperability for microwave access (WiMAX).

The embodiments in FIGS. 2 and 3 are used to determine the transmit power of an MU packet, and the digital gain and MCS rate of the N stations, enabling the N stations to receive MU packets from different distances while maintaining signal quality, thereby enhancing the efficiency of transmit power control.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wireless transmission method comprising:
    setting up a set of stations for a multi-user transmission;
    obtaining a modulation and coding scheme (MCS) rate and a power amplifier gain of each station in the set of stations;
    generating a maximum available MCS rate according to a plurality of MCS rates of all stations in the set of stations;
    selecting a power amplifier gain of the multi-user transmission according to at least the maximum available MCS rate;
    adjusting a digital gain of the each station according to the power amplifier gain of the multi-user transmission and the power amplifier gain of the each station;
    adjusting a frequency domain signal of the each station according to the digital gain of the each station to generate an adjusted frequency domain signal;
    converting a plurality of adjusted frequency domain signals of all stations in the set of stations into a time domain signal;
    generating an amplified signal according to the power amplifier gain of the multi-user transmission and the time-domain signal; and
    transmitting the amplified signal.

2. The method of claim 1, further comprising:
    if an MCS rate of a first station in the set of stations exceeds the maximum available MCS rate, updating the MCS rate of the first station to the maximum available MCS rate.

3. The method of claim 1, wherein generating the maximum available MCS rate according to the plurality of MCS rates of the all stations in the set of stations comprises:
    setting the maximum available MCS rate according to a mode of the plurality of MCS rates.

4. The method of claim 1, wherein generating the maximum available MCS rate according to the plurality of MCS rates of the all stations in the set of stations comprises:
    setting the maximum available MCS rate according to a mean of the plurality of MCS rates.

5. The method of claim 1, wherein generating the maximum available MCS rate according to the plurality of MCS rates of the all stations in the set of stations comprises:
    setting the maximum available MCS rate according to a median of the plurality of MCS rates.

6. The method of claim 1, wherein generating the maximum available MCS rate according to the plurality of MCS rates of the all stations in the set of stations comprises:
    setting the maximum available MCS rate according to a maximum of the plurality of MCS rates.

7. The method of claim 1, wherein generating the maximum available MCS rate according to the plurality of MCS rates of the all stations in the set of stations comprises:
    setting the maximum available MCS rate according to a minimum of the plurality of MCS rates.

8. The method of claim 1, wherein selecting the power amplifier gain of the multi-user transmission according to at least the maximum available MCS rate comprises:
    selecting the power amplifier gain of the multi-user transmission according to the maximum available MCS rate and a plurality of digital gains of the all stations of the set of stations.

9. The method of claim 1, wherein selecting the power amplifier gain of the multi-user transmission according to at least the maximum available MCS rate comprises:
    selecting the power amplifier gain of the multi-user transmission according to the maximum available MCS rate, a second largest one of the plurality of MCS rates, and a plurality of digital gains of the all stations of the set of stations.

10. The method of claim 1, wherein selecting the power amplifier gain of the multi-user transmission according to at least the maximum available MCS rate comprises:
    selecting the power amplifier gain of the multi-user transmission according to the maximum available MCS rate, a second smallest one of the plurality of MCS rates, and a plurality of digital gains of the all stations of the set of stations.

11. A wireless communication device comprising:
    a transmit power controller configured to obtain a modulation and coding scheme (MCS) rate and a power amplifier gain of each station in a set of stations for a multi-user transmission, generate a maximum available MCS rate according to a plurality of MCS rates of all stations in the set of stations, select a power amplifier gain of the multi-user transmission according to at least the maximum available MCS rate, and adjust a digital gain of the each station according to the power amplifier gain of the multi-user transmission and the power amplifier gain of the each station;
    a digital gain controller coupled to the transmit power controller, and configured to adjust a frequency domain signal of the each station according to the digital gain of the each station to generate an adjusted frequency domain signal;
    an inverse fast Fourier transform (IFFT) circuit coupled to the digital gain controller, and configured to convert a plurality of adjusted frequency domain signals of all stations in the set of stations into a time domain signal;
    a power amplifier coupled to the IFFT circuit, and configured to generate an amplified signal according to the power amplifier gain of the multi-user transmission and the time-domain signal; and an antenna coupled to the power amplifier, and configured to transmit the amplified signal.

12. The wireless communication device of claim 11, wherein the transmit power controller is further configured to if an MCS rate of a first station in the set of stations exceeds the maximum available MCS rate, update the MCS rate of the first station to the maximum available MCS rate.

13. The wireless communication device of claim 11, wherein the transmit power controller is configured to set the maximum available MCS rate according to a mode of the plurality of MCS rates.

14. The wireless communication device of claim 11, wherein the transmit power controller is configured to set the maximum available MCS rate according to a mean of the plurality of MCS rates.

15. The wireless communication device of claim 11, wherein the transmit power controller is configured to set the maximum available MCS rate according to a median of the plurality of MCS rates.

16. The wireless communication device of claim 11, wherein the transmit power controller is configured to set the maximum available MCS rate according to a maximum of the plurality of MCS rates.

17. The wireless communication device of claim 11, wherein the transmit power controller is configured to set the maximum available MCS rate according to a minimum of the plurality of MCS rates.

18. The wireless communication device of claim 11, wherein the transmit power controller is configured to select the power amplifier gain of the multi-user transmission according to the maximum available MCS rate and a plurality of digital gains of the all stations of the set of stations.

19. The wireless communication device of claim 11, wherein the transmit power controller is configured to select the power amplifier gain of the multi-user transmission according to the maximum available MCS rate, a second largest one of the plurality of MCS rates, and a plurality of digital gains of the all stations of the set of stations.

20. The wireless communication device of claim 11, wherein the transmit power controller is configured to select the power amplifier gain of the multi-user transmission according to the maximum available MCS rate, a second smallest one of the plurality of MCS rates, and a plurality of digital gains of the all stations of the set of stations.

* * * * *